United States Patent [19]
Pivawer

[11] 3,886,239
[45] May 27, 1975

[54] PROCESS FOR PREPARING TRIS (2-HALOALKYL) PHOSPHITES

[75] Inventor: Philip M. Pivawer, Hamden, Conn.

[73] Assignee: Olin Corporation, New Haven, Conn.

[22] Filed: Sept. 24, 1973

[21] Appl. No.: 400,386

Related U.S. Application Data
[63] Continuation-in-part of Ser. No. 283,973, Aug. 25, 1972, abandoned.

[52] U.S. Cl. ................................................. 260/977
[51] Int. Cl. ............................................. C07f 9/08
[58] Field of Search .................................... 260/977

[56] References Cited
UNITED STATES PATENTS

| | | |
|---|---|---|
| 2,866,808 | 12/1958 | Kolka.................................. 260/977 |
| 2,877,260 | 3/1959 | Campbell et al...................... 260/977 |
| 3,132,170 | 5/1964 | Brantigam et al. .................. 260/977 |
| 3,803,272 | 4/1974 | Pivawer et al. .................. 260/977 X |
| 3,810,961 | 5/1974 | Pivawer .............................. 260/977 |

Primary Examiner—Anton H. Sutto
Attorney, Agent, or Firm—F. A. Iskander; T. P. O'Day

[57] ABSTRACT

Tris(2-haloalkyl)phosphites are prepared by reacting a phosphorus trihalide with an alkylene oxide in the presence of a tertiary amine hydrohalide catalyst and ethylene dichloride solvent. These tris(2-haloalkyl)phosphites are useful intermediates in the preparation of flame retardant phosphate esters.

9 Claims, No Drawings

PROCESS FOR PREPARING TRIS (2-HALOALKYL) PHOSPHITES

This application is a continuation-in-part of co-pending U.S. application Ser. No. 283,973, filed Aug. 25, 1972, now abandoned.

This invention relates to a process for the preparation of tris(2-haloalkyl)phosphites. More particularly the invention relates to an improvement in the reaction of phosphorus trihalide with an alkylene oxide, in the presence of a tertiary amine hydrohalide catalyst, to form tris(2-haloalkyl) phosphite which is represented by formula I as follows:

wherein X is halogen and R is hydrogen or an alkyl radical.

Tris(2-haloalkyl)phosphites of formula I are useful flame retardant additives. They are also of particular utility as chemical intermediates in the preparation of highly flame retardant halogenated phosphorus esters. For example, a highly effective group of flame retardant additives are the tetrakis(2-haloalkyl)alkylene diphosphates. These can be prepared by reacting an alkylene glycol with bis(2-haloalkyl)phosphorohalidate, the latter in turn being prepared by reacting a tris(2-haloalkyl)phosphite of formula I with a halogen.

The tris(2-haloalkyl)phosphites are generally prepared by a well-known reaction wherein phosphorus trichloride is reacted with ethylene oxide. It is also known in this art to carry out such a reaction in the presence of carbon tetrachloride solvent. The use of such a solvent is disclosed in the German publication, Houben-Weyl, *Methoden der Organischen Chemie*, Volume 12/2 (1964).

In my co-pending application, Ser. No. 283,974, now U.S. Pat. No. 3,810,961 there is disclosed an improvement in the process of making tris(2-haloalkyl)phosphites wherein the reaction of phosphorus trichloride with alkylene oxide is effected in the presence of a tertiary amine hydrohalide catalyst. The use of such a catalyst has been found to have many desirable attributes. Thus this catalyst speeds up the reaction while allowing for some variation in the reaction temperature without otherwise materially affecting the speed and outcome of the reaction. The tertiary amine hydrohalide catalyst has the further advantage of preventing the formation of undesirable phosphonate by-products.

Now a further improvement has been found in the tertiary amine hydrohalide catalyzed reaction of phosphorus trihalide with alkylene oxide. In accordance with the invention, this improvement resides in carrying out the reaction in the presence of an inert liquid medium which is a solvent for the tertiary amine hydrohalide catalyst. Along with maximizing the effectiveness of the catalyst by providing a carrier medium to effect thorough and immediate contact with the reactive mixture, the use of such a solvent enables full adaptation of this catalytic reaction to continuous operation using a minimum of apparatus and effort to bring about adequate mixing of the catalyst with the reactants.

More in detail, the reaction to which the present invention pertains may be represented by equation II as follows:

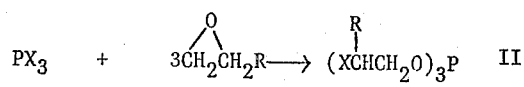

in which X and R have the significance indicated above.

In carrying out this reaction, any phosphorus trihalide in which the halogen is chlorine, bromine or a mixture thereof may be employed. Phosphorus trichloride and phosphorus tribromide are preferred, the trichloride being the most preferred.

The alkylene oxide which is reacted with the phosphorus trihalide according to the process of the invention can be any alkylene oxide having a 1,2-epoxide ring. Illustrative are ethylene oxide, propylene oxide, butylene oxide, pentylene oxide, epichlorohydrin, trichlorobutylene oxide, hexylene oxide, octylene oxide, and the like. Usually these oxides contain from 2 to 8 and preferably from 2 to 4 carbon atoms. The most preferred alkylene oxide is ethylene oxide which, when reacted with phosphorus trichloride according to the invention, yields tris(2-chloroethyl)phosphite.

Any suitable molar ratio of phosphorus trihalide to alkylene oxide may be employed. However, it is preferred to employ stoichiometric proportions of reactants, i.e., about 3 moles of alkylene oxide per each mole of phosphorus trihalide. This is in order to effect complete utilization or reaction of the phosphorus trihalide and to avoid the formation of undesirable by-products. Nevertheless, under proper conditions, it may be desirable in certain applications to employ a small stoichiometric excess or deficiency of alkylene oxide.

The reaction is carried out in the presence of a tertiary amine hydrohalide catalyst. Any such catalyst may be employed as taught in co-pending application Ser. No. 283,974, the entire disclosure of which is incorporated by reference herein. The preferred catalysts are the unsubstituted tertiary amine hydrochlorides and hydrobromides as exemplified by the following:

pyridine hydrochloride and hydrobromide
trimethyl amine hydrochloride and hydrobromide
triethyl amine hydrochloride and hydrobromide
picoline hydrochloride and hydrobromide
N-methyl piperidine hydrochloride and hydrobromide
tributyl amine hydrochloride and hydrobromide
N-methyl piperidine hydrochloride and hydrobromide
N-methyl morpholine hydrochloride and hydrobromide
trioctyl amine hydrochloride and hydrobromide
tridodecyl amine hydrochloride and hydrobromide
N,N-dimethyl aniline hydrochloride and hydrobromide
quinoline hydrochloride and hydrobromide
isoquinoline hydrochloride and hydrobromide
quinuclidine hydrochloride and hydrobromide In accordance with the invention, the reaction is carried out in the presence of an inert liquid medium. As distinguished from organic liquids which are non-solvents for the tertiary amine hydrohalide catalyst, such as carbon tetrachloride, an important feature of the liquid reaction medium employed according to the invention is that it be a solvent for the catalyst. It should also preferably be a solvent for the phosphorus trihalide and the alkylene oxide. Although any such solvent may be employed, ethylene dichloride is preferred for several reasons. It is highly compatible with the reaction mixture and serves as a solvent for the phosphite product which is formed. Thus in subsequently utilizing the product tris(2-chloroethyl)phosphite, for example, as a reactant in making bis(2-chloroethyl)phosphorochloridate, it can immediately be used to advantage as a solution thereof in the ethylene dichloride. Furthermore, as pertains to this particular utility of the tris(2-chloroethyl)phosphite, ethylene dichloride is formed as a by-product which makes for a readily available source of this solvent to be re-cycled for use in the phosphite-forming reaction.

Any suitable proportion of the solvent may be employed, Usually, however, from about 5 to about 1,500, and preferably from about 15 to about 600, parts by weight are employed per every 100 parts of total reactants, i.e., phosphorus trihalide and alkylene oxide. In the most preferred embodiment of the invention, about 20–250 parts by weight of solvent are employed per every 100 parts of total reactants.

The reaction is conducted at a temperature ranging from about −10° to about 150°C., and more preferably about 0°–130°C. A reaction temperature ranging from about 40 to about 115°C. is particularly preferred from an economic and practical standpoint. Conventional cooling means may be employed to maintain the reactive mixture at the desired temperature; or, according to the more preferred embodiments of the invention, the reaction is carried out under reflux conditions which enable controlling the temperature within the range of about 40°–115°C.

Any convenient order of mixing the reactants, catalyst and solvent may be employed. In batch operation, it is preferred to initially dissolve the phosphorus trihalide and the catalyst in the solvent. The alkylene oxide, alone or preferably as a solution thereof in the solvent, is then added gradually. On the other hand, in carrying out the reaction on a continuous basis, it is advantageous to initially dissolve the catalyst alone in the solvent. Then the phosphorus trihalide and alkylene oxide, each of which may be in solution form, are added in separate streams, incrementally.

The reaction of the alkylene oxide with the phosphorus trihalide is usually instantaneous resulting in the generation of a substantial amount of heat. Accordingly the temperature of the reaction medium must be monitored periodically or continuously, and conventional cooling means often must be employed in order to maintain the temperature within the ranges specified above. It is also generally preferred to exclude any moisture from the reaction medium such as by using a blanket of nitrogen gas.

Upon completion of the reaction, the tris(2-haloalkyl)phosphite is recovered in the form of a solution thereof in the solvent which may then be removed by conventional means such as evaporation. Furthermore, if the reaction product is desired in a highly purified form, it may be subjected to suitable purification operations. However, neither purification nor the removal of the solvent are usually necessary when the product phosphite is to be used in the preparation of tetrakis(2-haloalkyl)alkylene diphosphate flame retardants.

The product of the process of the invention is of utility as a flame retardant additive. It is also of particular utility in a two-step process for the preparation of flame retardant halogenated phosphate diesters. Thus the tris(2-haloalkyl)phosphite obtained according to the invention can be reacted with a halogen gas to form bis-(2-haloalkyl)phosphorohalidate, and this in turn can then be reacted with an alkylene glycol to yield tetrakis(2-haloalkyl)alkylene diphosphate. The latter compound is a highly effective flame retardant additive for use in polyurethane foam. A detailed description of the utility of tetrakis(2-haloalkyl)alkylene diphosphate in making flame retardant polyurethane foam is provided in U.S. Pat. No. 3,707,586 which issued to R. J. Turley on Dec. 26, 1972.

Several benefits are realized by carrying out the catalytic reaction of phosphorus trihalide with alkylene oxide in the presence of ethylene dichloride. First, acting as a solvent for the tertiary amine hydrohalide catalyst as well as for the reactants, the presence of the ethylene dichloride makes for most efficient utilization of the catalyst. This in turn means that the advantages which derive from using this highly desirable catalyst are maximized, i.e., minimum reaction time, elimination of undesirable by-products, and maximum reaction temperature latitude. Secondly, by providing a solvent medium for this catalyst, the reaction can be carried out on a continuous basis with a minimum of operations which are necessary to bring about adequate mixing of the catalyst with the reactants. A further advantage which derives from the use of ethylene dichloride in the continuous production of tris(2-haloalkyl)phosphite is that by simply controlling the amount of this solvent which is present in the reaction mixture, an optimum reaction temperature range of about 97°–103°C. can be easily maintained when carrying out the reaction under reflux conditions. Finally, as noted earlier, the use of ethylene dichloride has inherent advantages in connection with utilizing the phosphite product in making bis(2-chloroethyl)phosphorochloridate, an intermediate used in the preparation of tetrakis(2-haloalkyl)alkylene diphosphate.

The following examples are provided to illustrate the invention. In these examples, all parts and percentages are by weight unless otherwise specified.

EXAMPLE 1

In a reaction vessel equipped with a thermometer and a cooling jacket, 137.4 grams (1 mole) of phosphorus trichloride were dissolved in 275 grams of ethylene dichloride. One gram of pyridine hydrochloride catalyst was added and dissolved in the solution. While maintaining the contents of the reaction vessel at a temperature of 5°–14°C., a solution of 132 grams (3 moles) of ethylene oxide in 264 grams of ethylene dichloride was gradually added over a period of 5 hours. This addition was made through an inlet above the surface of the phosphorus trichloride solution. The reaction was complete after an additional 5 minutes, at which time a solution of the product tris(2-chloroethyl)phosphite dissolved in ethylene dichloride was removed from the reaction vessel. This solution was subjected to analysis by nuclear magnetic resonance (NMR). The analysis showed that a minimum of 99% of the phosphorus in the solution was in the form of the phosphite thus confirming the formation of tris(chloroethyl)phosphite. NMR analysis further showed no detectable phosphonate in the product.

EXAMPLE 2

The identical procedure of Example 1 was repeated except that the contents of the reaction vessel were maintained at 38°–42°C. instead of 5°–14°C. The same results as in Example 1 were obtained.

EXAMPLE 3

The identical procedure of Example 1 was followed except that the reaction was carried out at a temperature of 20°–30°C. and for a period of 8 hours. Again the same results of Example 1 were obtained, with no phosphonate detected in the reaction product.

EXAMPLE 4

The procedure of Example 1 was followed except that the ethylene oxide was used as is, rather than as a solution thereof; and the reaction was carried out under reflux conditions at a temperature of 102°C. The same results as in Example 1 were obtained with no phosphonate detected in the reaction product.

EXAMPLE 5

The procedure of Example 4 was followed except that instead of pyridine hydrochloride, N,N-dimethyl aniline hydrochloride was used as the catalyst, and this was generated in-situ using 2 grams of N,N-dimethyl aniline and 2 grams of ethylene chlorohydrin. The same results of Example 4 were obtained with no detectable phosphonate formed.

EXAMPLES 6–7

The identical procedure of Example 1 was followed except that instead of 1 grams of pyridine hydrocloride, 0.50 gram was used in Example 6 and 0.25 gram was used in Example 7. In each case the product, analyzed by NMR, contained no detectable phosphonate.

What is claimed is:

1. In a process for preparing a tris(2-haloalkyl)phosphite by the reaction of a phosphorus trihalide, in which the halogen is chlorine, bromine or a mixture thereof, with an alkylene oxide having a 1,2-epoxide ring in the presence of a tertiary amine hydrohalide catalyst, the improvement which comprises carrying out said reaction in the presence of ethylene dichloride solvent.

2. The process of claim 1 wherein said alkylene oxide has 1–4 carbon atoms and said phosphorus trihalide is phosphorus trichloride or phosphorus tribromide.

3. The process of claim 2 wherein about 3 moles of said alkylene oxide are employed per every mole of said phosphorus trihalide.

4. The process of claim 3 wherein said reaction is carried out at a temperature ranging from about 0 to about 130°C.

5. The process of claim 4 wherein said phosphorus trihalide is phosphorus trichloride and said alkylene oxide is ethylene oxide.

6. The process of claim 5 wherein said catalyst is an unsubstituted tertiary amine hydrochloride or hydrobromide.

7. The process of claim 6 wherein said reaction is carried out in the absence of moisture.

8. The process of claim 7 wherein said reaction is carried out under reflux conditions.

9. The process of claim 8 wherein said ethylene dichloride is employed in a proportion ranging from about 50 to about 250 parts per every 100 parts of the combined weight of said phosphorus trichloride and said ethylene oxide.

* * * * *